(12) United States Patent
Cepuritis et al.

(10) Patent No.: US 12,460,357 B2
(45) Date of Patent: Nov. 4, 2025

(54) JOINTLESS CONCRETE COMPOSITE PAVEMENT

(71) Applicant: PRIMETEH, AS, Riga (LV)

(72) Inventors: Rolands Cepuritis, Riga (LV); Janis Oslejs, Riga (LV); Bradley Justin Pease, North Vancouver (CA); Aldis Zegelis, Vilkene (LV); Janis Kamars, Adazi (LV)

(73) Assignee: PRIMETEH, AS, Riga (LV)

( * ) Notice: Subject to any disclaimer, the term of this patent is extended or adjusted under 35 U.S.C. 154(b) by 840 days.

(21) Appl. No.: 17/778,056

(22) PCT Filed: Sep. 14, 2020

(86) PCT No.: PCT/LV2020/050004
§ 371 (c)(1),
(2) Date: May 19, 2022

(87) PCT Pub. No.: WO2021/025548
PCT Pub. Date: Feb. 11, 2021

(65) Prior Publication Data
US 2022/0412017 A1    Dec. 29, 2022

(30) Foreign Application Priority Data
Nov. 19, 2019 (LV) .................................... P-19-62

(51) Int. Cl.
*E01C 7/14* (2006.01)
*C04B 16/06* (2006.01)
(Continued)

(52) U.S. Cl.
CPC .......... *E01C 7/142* (2013.01); *C04B 16/0633* (2013.01); *C04B 28/04* (2013.01);
(Continued)

(58) Field of Classification Search
CPC ... E01C 7/12; E01C 7/142; E01C 7/30; C04B 16/0633; C04B 28/04; C04B 28/065; C04B 28/08; C04B 2111/0075
(Continued)

(56) References Cited

U.S. PATENT DOCUMENTS 4,708,516 A * 11/1987 Miller ....................... E01C 7/18
404/31
8,297,874 B2 * 10/2012 Krzyzak ............... E01C 11/224
404/31
(Continued)

FOREIGN PATENT DOCUMENTS

AU    2004235651 A1 *  1/2005
CN      2730921 Y     10/2005
(Continued)

OTHER PUBLICATIONS

National Concrete Pavement Technology Center, Guide to Concrete Overlay Solutions, pp. 29, 2007.
(Continued)

*Primary Examiner* — Raymond W Addie
(74) *Attorney, Agent, or Firm* — Brooks Kushman P.C.

(57) ABSTRACT

A pavement system that avoids the need for traditional contraction joints regardless of dimension of the pavement. The concrete composite pavement, comprises (i) a gap-graded concrete first layer; (ii) a flexural-hardening fiber reinforced mortar second layer, wherein the gap-graded concrete comprises cement, water and coarse aggregate, the flexural-hardening fiber reinforced mortar comprises cement; water, fine aggregate with a maximum particle size; fiber reinforcement comprising of synthetic and/or metal fibers; wherein the total thickness of the composite pavement is selected depending on the required maximum service point load, using the following formula $H=(F/100)^{0.5} \times 100$ mm, where H is the total thickness of the composite (Continued)

pavement and F is maximum service point load; wherein the ratio of the thickness of flexural-hardening fiber reinforced mortar second layer to the total thickness of the composite pavement is within the range of 1:5 to 2:5.

13 Claims, 4 Drawing Sheets

(51) Int. Cl.
  *C04B 28/04*     (2006.01)
  *C04B 28/06*     (2006.01)
  *C04B 28/08*     (2006.01)
  *E01C 7/12*      (2006.01)
  *E01C 7/30*      (2006.01)
  *C04B 111/00*    (2006.01)
(52) U.S. Cl.
  CPC ............ *C04B 28/065* (2013.01); *C04B 28/08* (2013.01); *E01C 7/12* (2013.01); *E01C 7/30* (2013.01); *C04B 2111/0075* (2013.01)
(58) Field of Classification Search
  USPC .............................................. 404/17, 31, 70
  See application file for complete search history.

(56) References Cited

U.S. PATENT DOCUMENTS

| | | | |
|---|---|---|---|
| 2008/0287570 A1* | 11/2008 | Thayer | E01C 7/26 427/136 |
| 2013/0036947 A1* | 2/2013 | Thayer | E01C 7/30 106/668 |
| 2014/0272369 A1* | 9/2014 | King | C04B 26/14 428/221 |
| 2021/0108017 A1* | 4/2021 | Krayer | C09D 151/003 |

FOREIGN PATENT DOCUMENTS

| | | |
|---|---|---|
| DE | 102005054235 A1 | 5/2007 |
| JP | 2017133255 A | 8/2017 |

OTHER PUBLICATIONS

The Concrete Society, Technical Report 34—Concrete Industrial Ground Floors—A Guide to Design and Construction, 2016, pp. 104.

International Search Report for PCT/LV2020/050004, Prepared by the European Patent Office, Mailing Date Dec. 21, 2020, 3 pages.

American Concrete Institute Committee, article "Guide for Design of Jointed Concrete Pavements for Streets and Local Roads", ACI: "325.12R-02", vol. 325, pp. 32, 2002.

American Concrete Institute Committee, article "Guide for Construction of Concrete Pavements", ACI: "325.9R-15", vol. 325, pp. 62, 2015.

American Concrete Institute Committee, article "Guide to Roller-Compacted Concrete Pavements", ACI: "327R-14", vol. 327, pp. 51, 2015.

American Concrete Institute Committee, article "Guide for the Design and Construction of Concrete Parking Lots", ACI: "330R-08", vol. 330, pp. 36, 2008.

American Concrete Institute Committee, article "Report on Pervious Concrete", ACI: "522R-10", vol. 522, pp. 40, 2010.

* cited by examiner

JOINTLESS CONCRETE COMPOSITE PAVEMENT

CROSS-REFERENCE TO RELATED APPLICATION

This application is the U.S. national phase of PCT Application No. PCT/LV2020/050004 filed on Sep. 14, 2020, which claims priority to LV Patent Application No. P-19-62 filed on Nov. 19, 2019, the disclosures of which are incorporated in their entirety by reference herein.

TECHNICAL FIELD

The invention relates generally to the construction of exterior pavements for roads, bridges, parking areas or hardstands, and similar exterior pavements, which do not require contraction joints.

BACKGROUND ART

Exterior concrete pavements, used for various application including parking lots, hardstands, industrial site paving, highways, roads, airfields, runways, and taxiways, are made from plain or reinforced concrete and include various types of joints for the control of cracking and due to practical considerations of the design and construction process. The basic types of joints utilized in such pavements consist of construction joints, isolation joints and contraction joints, with the latter typically comprising the vast majority (length-wise) of joints utilized for pavements.

Construction joints are utilized for convenience during construction as a means to cleanly stop concrete casting e.g., after a particular period of time (e.g., day). Isolation joints are utilized to separate the pavement from adjacent structures or elements, allowing for differential movement between to neighboring elements without associated damage to either element. Construction and isolation joints are typically achieved by means of casting the pavement concrete against formwork or isolation material, pre-installed at appropriate locations per the demands of the given project.

Contraction joints, also known as control joints, are cut into concrete pavement at a consistent spacing, in an attempt to localize cracking of the concrete caused by thermal contraction and drying shrinkage of the concrete. Contraction joints are formed by saw-cutting the top surface or otherwise reducing the effective slab thickness of the concrete, to intentionally create a plane of weakness in the concrete. The effectiveness of contraction joints to control crack location depends on the joint spacing, the depth and time (after concrete placement) of the saw cutting, ambient environmental conditions, details of the concrete mix design, evaporation protection and concrete curing methods employed, among other considerations. Further, the joint plan (i.e., location, spacing, and depth of joints) shall be carefully designed to avoid acute angles, T- or L-shaped areas, and other disadvantageous details with regard to crack control.

Even with the great effort required for saw cutting contraction joints, which requires heavy equipment that produces potentially harmful dust and significant noise, detrimental cracking can often still occur outside of contraction joints. The use of contraction joints also leads to specific deterioration processes that can occur at contraction joints including D-cracking, curling, and washout of the subgrade material. These deterioration processes at the contraction joint can further lead to secondary damage to the pavement and/or vehicles crossing over the contraction joint. The joint may become uneven due to differential movements between neighboring portions of the pavement, which can lead to impact as wheels cross the joint. This impact may damage the pavement itself or lead to wear and tear on machines and equipment making use of the pavement. Alternatively, the pavement at the joint may become improperly supported due to washout of subgrade and/or curl of the slab itself, leading to flexural load situations not considered in the design and beyond the capacity of the pavement.

Traditional design approaches for exterior concrete pavements rely on appropriate detailing, including spacing and arrangement, of contraction joints to control shrinkage-induced cracking of the pavement [1, 2, 3]. Even use of non-traditional material solutions for exterior pavements, including pervious (or gap-graded) concrete or roller compacted concrete, still typically requires inclusion of contraction joints to avoid random cracking [4, 5]. The solutions disclosed in cited patent documents [8, 9, 10] also have number of drawbacks, solved in present invention.

It is noted that continuously reinforced concrete pavements are installed with either limited or no contraction joints. However, such pavements are known to suffer from significant cracking with cracks typically spaced at intervals of approximately 3 to 10 feet. The cracks in these cases, even when well-controlled with regard to crack width, can lead to corrosion of the continuous reinforcement particularly when exposed to de-icing chemicals during service.

Concrete overlays on existing pavements (either concrete, asphalt, or combinations thereof), also known as whitetopping when applied to asphalt pavement, is a known technique to extend the life of existing, deteriorated pavements. The overlays may either be bonded or unbonded to the existing pavement and in both cases, contraction joints are required to control cracking of the overlay [6]. The same concerns with joints described above also apply to joints in overlays; therefore, eliminating the need for contraction joints in overlays would similarly simplify the construction process and improve the long term structural and durability performance of overlays.

Avoiding the need for contraction joints and limiting cracking of exterior pavements would be a significant simplification in the construction process. Eliminating the contraction joints, while also limiting or avoiding cracking of the pavement would provide a drastic improvement in the structural and durability performance of exterior pavements and to reduced wear and tear on equipment and vehicles traversing the pavement.

SUMMARY OF THE INVENTION

The invention is an exterior pavement solution that allows for limitless dimension without contraction joints. It was discovered that a unique combination of two distinct concrete layers allows for the elimination of joints in exterior pavements as detrimental cracks and large joint openings were not observed in trial slabs. The first (according to one embodiment—bottom-most) layer comprises concrete mixture that does not contain sand, also referred to as gap-graded concrete, pervious concrete, or drainage concrete, for example, following the definition, as provided in ACI 522-10 "Report on Pervious concrete" [4]. The second layer (a top layer) comprises a flexural-hardening fibre reinforced mortar. The combination of these two materials is found to result in exterior pavement that did not detrimentally crack or experience large opening of joints between neighbouring slabs cast years prior to placement of the invented slab, even without the use of contraction joints.

The first (bottom) layer concrete by itself has been applied for use in gardens, tennis courts, and for pavements and is known to have a limited shrinkage characteristic upon drying. However, such concrete, when used as a drainage concrete, is known for its low bearing capacity limited to light foot traffic and to suffer from clogging due to accumulation of detritus and debris over time. Further, gap-graded concrete has limited structural capacity in flexure and tension as the material is not suitable for inclusion of traditional reinforcement.

Flexural-hardening fibre reinforced mortar alone is generally financially non-viable for use in pavements due to the high contents of costly constituent materials, including cementitious materials and fibers. The combination of the bottom layer and the top layer according to the invention also reduces the total thickness of the pavement.

The combination of these materials provides a novel exterior pavement that is surprisingly volumetrically stable and with a high flexural strain capacity on its top surface. This permits the pavement material to be used for new pavements or as an overlay on existing pavements without the need for contraction joints in exterior applications. With the invention, there is no technical limit to the maximum baysize, and construction joints can be spaced as far as needed and as is feasible with practical considerations (e.g., termination of casting for a particular period of time). By eliminating joints, a further characteristic of the invention is that maintenance demands, and the associated direct and indirect (i.e., down-time) costs, for the pavement and equipment making use of the pavement are reduced.

The conducted full-scale experiments have shown surprising synergetic effect of the proposed pavement, characterized in (i) prevention of water ingress into the pavement from the top, (ii) allowing for expansion of water (in the bottom layer) during freezing without development of stress at the interface, (iii) ensuring partial infiltration of the second layer concrete into the first layer gap-graded concrete, thereby prevention of delamination by separation of the layers.

Two basic embodiments are comprised herein, including use of the invention for use in new exterior pavement construction and use of the invention as a repair solution for resurfacing existing exterior pavements. The invention may also be suitable for interior applications, including warehouse and other industrial floors.

DISCLOSURE OF THE INVENTION

Figure 1:
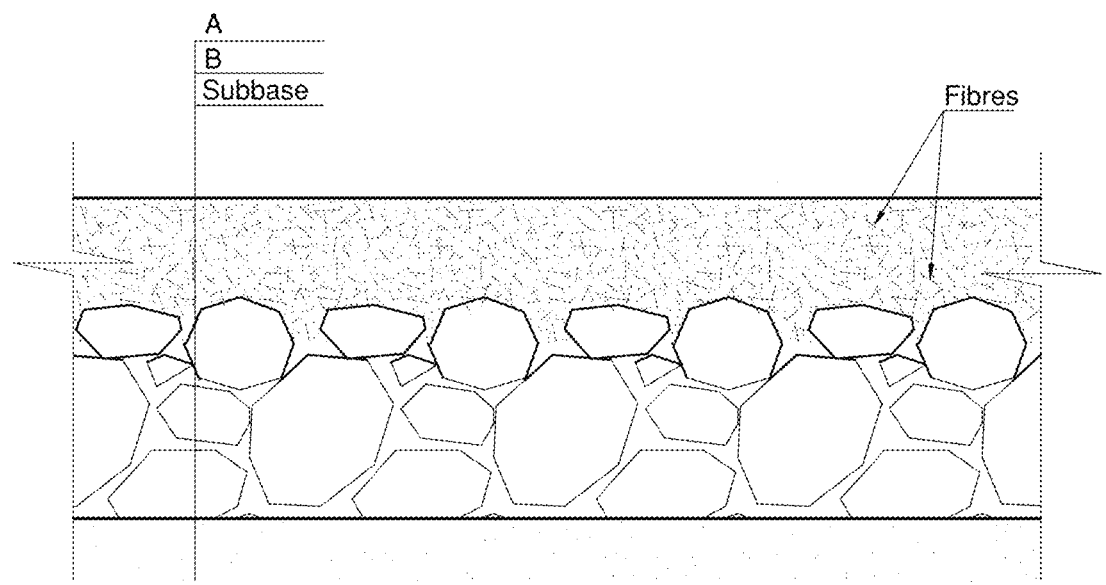
FIG. 1—Schematic representation of one embodiment of the concrete composite pavement with A indicating the gap-graded concrete first layer (the bottom layer) and B indicating the flexural-hardening fibre reinforced mortar second layer (the top layer).

The objective of this invention is to provide a composite concrete pavement for exterior paved areas that does not require contraction joints for cracking control and to address length changes in the concrete from thermal contraction and drying shrinkage. Another objective of the invention is to provide for lean and simple installation of pavement, being of the significantly reduced thickness and still withstanding the increased load.

The proposed concrete composite pavement, comprises: (i) a gap-graded concrete first layer (the bottom layer) and (ii) a flexural-hardening fiber reinforced mortar second layer (the top layer). The gap-graded concrete comprises cement, water and coarse aggregate with particles size from 4 to 45 mm, preferably, from 8 to 16 mm. The flexural-hardening fiber reinforced mortar comprises cement, expansive concrete additive, water, fine aggregate with a maximum particle size of not greater than 8 mm, fiber reinforcement comprising of synthetic and/or metal fibers having diameter of 10 to 500 microns and length of 3 to 35 mm. The total thickness of the composite pavement is selected depending on the required maximum service point load, using the following formula $H=(F/100)^{0.5} \times 100$ mm, where H is the total thickness of the composite pavement and F is the required maximum service point load. For instance, if the estimated maximum load resistance is F=100 kN, the total thickness H of the composite pavement should be 100 mm. The ratio of the thickness of the flexural-hardening fiber reinforced mortar second layer to the total thickness of the composite pavement is within the range of 1:5 to 2:5.

According to another embodiment the gap-graded concrete first layer and/or the flexural-hardening fiber reinforced mortar second layer further comprises admixtures. Said admixtures can be air-entraining admixture, hydration-controlling admixture, internal curing admixture, water-reducing admixture, viscosity-modifying admixture and polymers.

According to the preferred embodiment, the gap-graded concrete first layer (the bottom layer) comprises the following amount of ingredients in 1 $m^3$ of the gap-graded concrete: cement 200-415 kg; coarse aggregate 1190-1080 kg, and water, wherein the amount of water is selected to have the following range of water to cement ratio: 0.27-0.38. The flexural-hardening fiber reinforced mortar second layer (the top layer) preferably comprises the following amount of ingredients in 1 $m^3$ of the flexural-hardening fiber reinforced mortar: cement 500-1200 kg; expansive concrete additive: 1 to 30% by mass of cement and sufficient to achieve the positive net length change at infinite time; fine aggregate 650-1200 kg; synthetic fibers 1.5-27 kg and/or metal fibers 15-150 kg; and water, wherein the amount of water is selected to have the following range of water to cement ratio: 0.20-0.40. The expansive concrete additive can be calcium sulfo-aluminate, calcium aluminate, tricalcium aluminate, calcium oxide, or magnesium oxide, or a combination thereof.

According to yet another embodiment from 5 to 90% of the cement used in the gap-graded concrete first layer and/or the flexural-hardening fiber reinforced mortar second layer is replaced by supplementary cementitious materials. In this case the water to binder (i.e. cement plus supplementary cementitious materials) ratio set forth above should be kept. The supplementary cementitious material can be ground granulated blast furnace slag, fly ash, microsilica, calcined clay, pozzolana of a natural origin, burnt shale, limestone or a combination of the above.

According to yet another embodiment 5-50% of the cement used in the gap-graded concrete first layer and/or the flexural-hardening fiber reinforced mortar second layer is replaced by mineral fillers. The mineral fillers can be produced out of sedimentary, igneous or metamorphic rock types.

According to yet another embodiment, 1-50% of the cement used in the gap-graded concrete first layer and/or the flexural-hardening fiber reinforced mortar second layer is replaced by supplementary cementitious materials and 5-45% of the cement used in the gap-graded concrete first layer and/or the flexural-hardening fiber reinforced mortar second layer is replaced by mineral fillers.

The ultimate flexural capacity of the flexural-hardening fibre reinforced mortar shall be adjusted to suit the structural loads for a specific project by adjusting the content and type of fibre used. Adjustment of the fiber type and content also allows for control of the depth of infiltration of the flexural-hardening fibre reinforced mortar into the gap-graded concrete. This characteristic of the invention permits adjustment of the bond strength (i.e., bond between the first and second layer of the composite pavement), which is another novel characteristic of the invention.

According to another embodiment the gap-graded concrete first layer may further comprise fibres, in particular, synthetic polymer fibres.

According to yet another embodiment, the flexural-hardening fiber reinforced mortar second layer further comprises deformed bar reinforcement.

According to the preferred embodiment the pavement is joint free. However, laying of the proposed pavement using contraction joints is also possible. Nevertheless, contraction joints are not technically needed and also not economically feasible, due to increased construction and maintenance costs.

The first layer shall be placed, leveled and compacted prior to installation of the second layer. Placement of the first layer may be achieved by dump/tipper truck or other appropriate means familiar to one skilled in the art. Leveling, to the appropriate elevation or profile, may be achieved by use of laser-controlled grading equipment, highway grader, or other means to achieve a well-controlled level and profile of the gap-graded concrete. Compaction of the gap-graded concrete may be achieved by means of compaction equipment including various types of road rollers including pneumatic-tire rollers, single or dual drum rollers, etc., vibratory plate compactors, by multiple passes of a tired- or tracked vehicle, or other suitable means familiar to one skilled in the art. The first layer may be installed directly against the sub-base material (e.g., compacted subgrade, existing pavement, blinding concrete, etc.) or, if necessary due to project-specific requirements to water- or gas-tightness, against membrane materials. The sub-base shall be with an optimum compaction according to standards known to one skilled in the art and with a K-value of Westergaard bearing capacity.

The second layer may be installed successively during the same day or on a future day. Delay to installation of the second layer shall only be limited to a duration such that the first layer of gap-graded concrete is not permitted to become clogged with debris.

Subsequent to compaction of the first layer, the second layer shall be placed, leveled and consolidated. No bonding agents are to be used. Placement may be achieved by typical means of concrete placement including pumping, direct discharge from a ready mix truck, or other common means familiar to one skilled in the art. Leveling and consolidation may be achieved using a concrete laser screed, through the use of standard probe vibrators and concrete hand tools familiar to one skilled in the art, or by means of modifying the concrete mix design to achieve a self-leveling, self-consolidating characteristic of the flexural-hardening fibre reinforced mortar.

According to yet another embodiment, the pavement further comprises one or more layers of existing pavement or flooring below the gap-graded concrete first layer (as a repair solution for resurfacing existing pavements).

When utilized as a repair on a deteriorated pavement, the invention provides additional benefits. A common issue for overlay repairs is delamination of the overlay from the subgrade/original pavement. In the invention, bond between the top layer and bottom layer is enhanced by partial infiltration of the porous concrete by the flexural-hardening fiber reinforced mortar.

EXAMPLES OF IMPLEMENTATION OF THE INVENTION

Example 1

The invention is used in this example in a jointfree 90 mm total design thickness (60 mm thick gap-graded first layer, i.e. a bottom layer, and 30 mm thick flexural-hardening fibre reinforced mortar second layer, i.e. a top layer) with a 50 kN wheel load traffic and 50 kN/m$^2$ uniformly distributed loading and with a sub-base having a Westergaard K-value of 0.1 N/mm$^3$.

Figure 2:
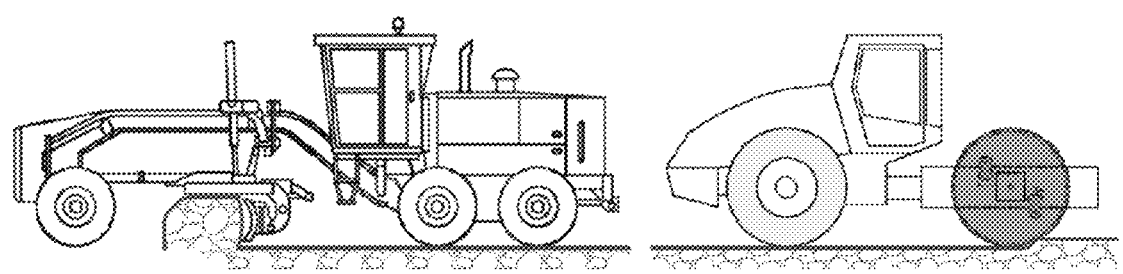
FIG. 2—photographs, showing placement and compaction of the gap-graded first layer of the composite pavement.

Concrete for the gap-graded first layer (the bottom layer) concrete consisted of 290 kg/m$^3$ of a CEM I cement, 87 kg/m$^3$ water, water-reducing additive with a dosage rate of 1.74 kg/m$^3$ and 1622 kg/m$^3$ of a granite coarse aggregate with a particle size distribution of 5-16 mm. This layer was installed by means of a placement from a dump truck, spreading of the concrete using a laser screed-equipped machine equipment, and compaction by means of a highway roller as shown in FIG. 2. The mix design for the second layer (the top layer) consisted of 800 kg/m$^3$ of a CEM I cement, 45 kg/m$^3$ of CSA (calcium sulfo-aluminate) expansive concrete additive, 240 kg/m$^3$ water, water-reducing additive with a dosage rate of 12.8 kg/m$^3$, 1172 kg/m$^3$ of a 0-4 mm fine aggregate, and 9.0 kg/m$^3$ of a polypropylene fiber with length of 35 mm and diameter of 0.5 mm. This mix was placed by pump over the gap graded concrete (the bottom layer) immediately after its compaction, leveled with hand tools and broom finished upon initial set.

The test area of the pavement cast in the exterior space of an industrial warehouse was subjected to full scale testing as described below.

Figure 3:
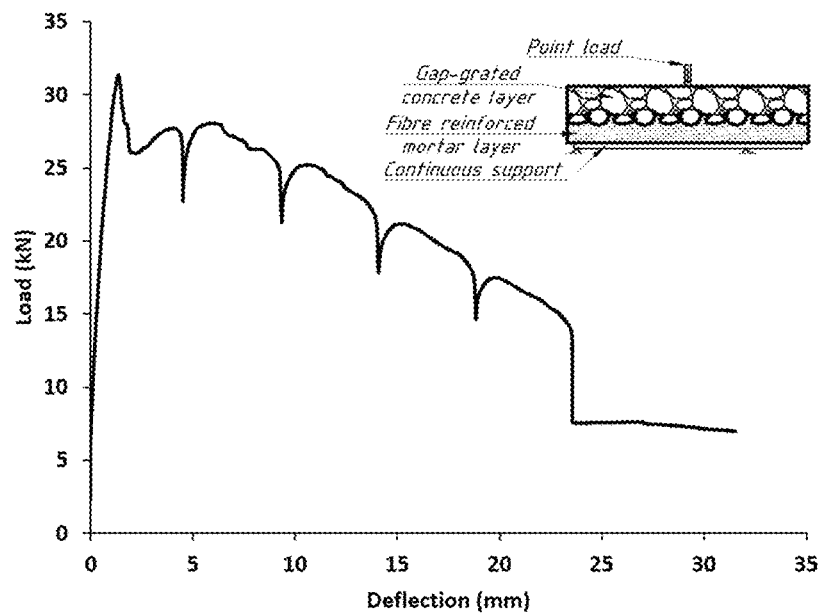
FIG. 3—a graph and photograph, showing test results of SIA 162/6 panel having 90 mm total thickness with gap-graded concrete primarily in tension.
Figure 4:
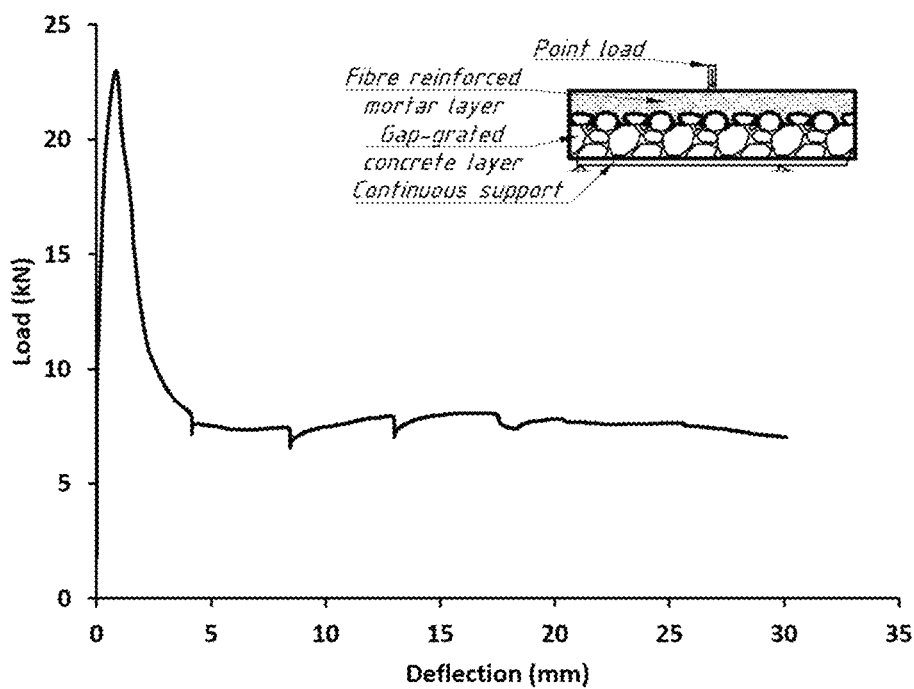
FIG. 4—a graph and photograph, showing test results of SIA 162/6 panel having 90 mm total thickness with gap-graded concrete primarily in compression.

Plates of the pavement, extracted from the trial slab, were evaluated per the SIA 162/6 test method in both orientations (i.e., with the gap-graded concrete primarily in tension and with the gap-graded concrete primarily in compression). Results found that the panels with a total thickness of 90 mm and a span of 760 mm achieved an ultimate point loading of 22.9 kN with the gap-graded concrete primarily in tension and a 31.3 kN ultimate point load with the gap-graded concrete primarily in compression. Further, for both orientations the load transferred, even after cracking, did not drop below 7.0 kN for vertical deflections up to 30 mm. Results from the SIA 162/6 testing are shown in FIG. 3 and FIG. 4.

Figure 5:
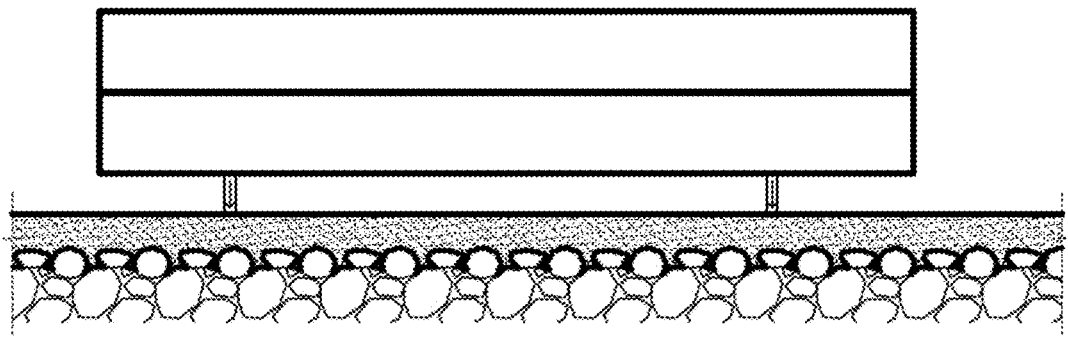
FIG. 5—a photograph showing testing rig for full-scale load testing of the proposed pavement.
Figure 6:
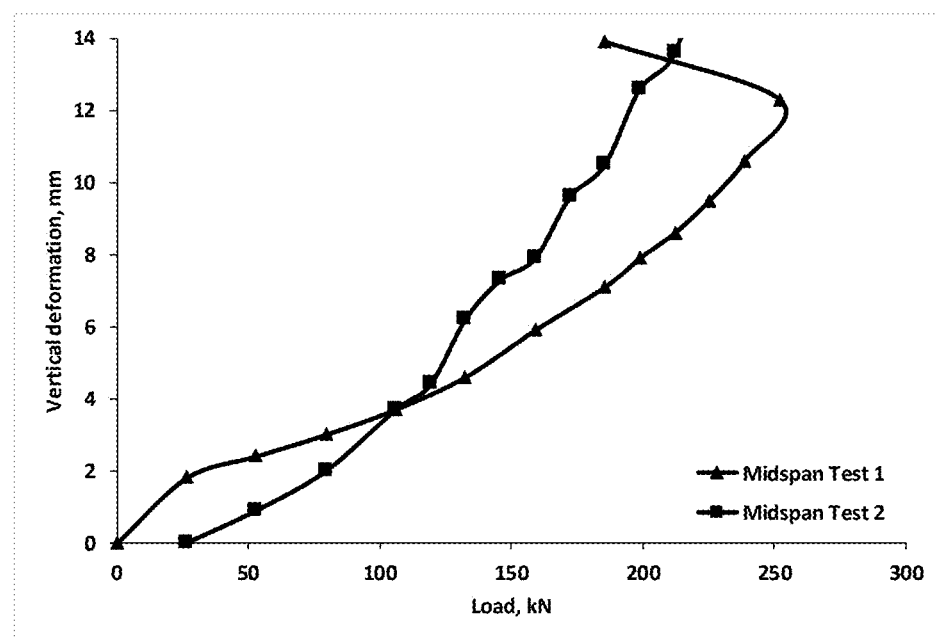
FIG. 6—a graph, showing results of full-scale load testing of two midspan areas for the proposed pavement with total thickness of 10 cm.
Figure 7:
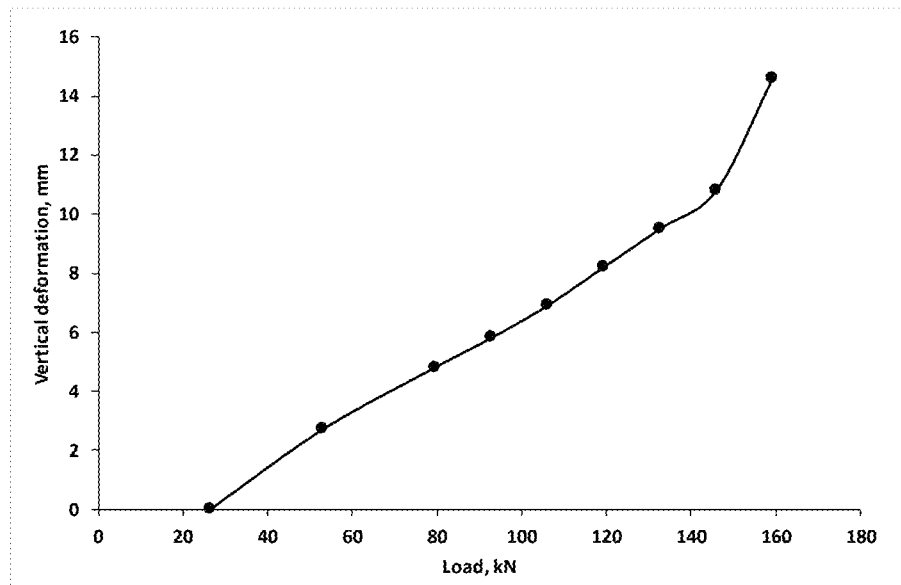
FIG. 7—a graph, showing results of full-scale load testing of free edge area for the proposed pavement with total thickness of 10 cm.

Full-scale load testing of the trial slab was also completed by applying point load through a 0.2×0.2 m² loading plate. The load was applied at the centre and on a free edge of the slab. For testing, load was applied to the load plate using a hydraulic jack reacting against a steel and concrete frame (shown in FIG. 5), while vertical displacements were measured. Two tests were completed in a mid-span location of the slab, while one test was completed at the free edge of the slab. The same reaction frame was also used to evaluate the modulus of subgrade reaction, which was determined to be 0.1 N/mm³. At the midspan, cracks were first observed with point loads of 225-250 kN, which were considered to be equivalent to the ultimate point load. For the free edges, cracking was first observed with a point load of 130 kN and the ultimate load level was recorded as 160 kN.

The corners and free edges of the trial slab did not show any signs of curling and structural cracks were not observed with time when the loading intensity did not exceed >100 kN to confirm the significant slab shrinkage reduction to almost zero.

In case of higher loading intensities the thickness shall be increased like usually as the inverse of the square of thickness thus, a 100 kN back-to-back point load (100 kN+100 kN=200 kN of maximum point load) shall need a total thickness of $100/50=2=(Hx/100)^2$.

Thus $2\times100^2=Hx^2$ hence $Hx=141$ mm consisting in 40 mm top and 101 mm bottom.

According to the invention, the slab can be significantly thinner than a traditional one. The full-scale test slab teaches that a 90 mm slab according to the invention shows a single collapse load of 225-250 kN on a K=0.1 N/mm³ reaction coefficient. The maximum wheel load intensity can be derived by dividing by a global safety factor of 1.5 (material factor)×1.5 (loading factor)×1.4 (dynamic factor), thus 225 kN/3.15=71 kN.

When comparing to provisions from TR 34 [7] for an A 252 wiremesh reinforced slab of the same 90 mm thickness subjected to a single point load, only a 29 kN wheel load is permissible.

The needed thickness of a slab of the invention to resist a 71 kN wheel load is thus significantly thinner than the required thickness of a traditional slab with bottom mesh, which should be of thickness $H=(71/29)^{0.5}\times90$ mm=141 mm.

A slab of the invention is also applicable for use in internal spaces of e.g., warehouses, plants, etc.

Example 2

The invention was used in a second example casting in a ready-mix concrete yard with load from heavy trucks and excavators. In this example, the slab type had a 100 mm total design thickness (65 mm thick gap-graded first layer, i.e. the bottom layer, and 35 mm thick flexural-hardening fibre reinforced mortar second layer, i.e. the top layer).

Figure 8:
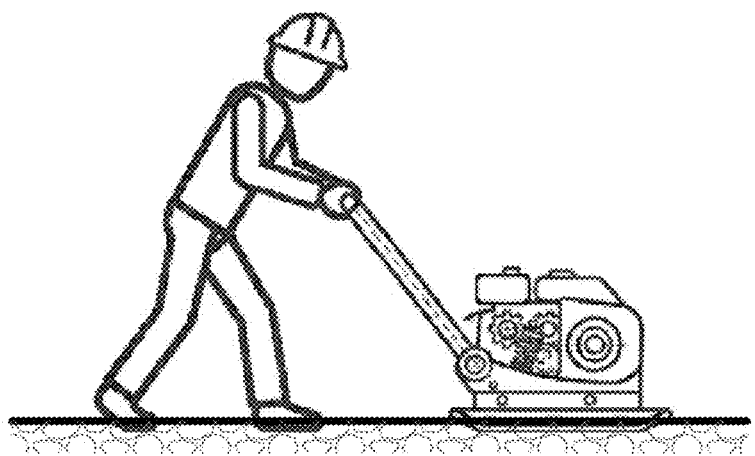
FIG. 8—photograph, showing compaction of the gap-graded first layer by means of a vibrating plate soil compactor.

Concrete for the gap-graded first (i.e. the bottom) layer concrete consisted of 290 kg/m³ of a CEM II/A-T cement, 87 kg/m³ water, water-reducing additive with a dosage rate of 1.74 kg/m³ and 1500 kg/m³ of a dolomite coarse aggregate with a particle size distribution of 8-16 mm. This layer was installed by means of a placement from a dump truck, spreading of the concrete using a steer loader and handtools, and compaction by means of a vibrating plate soil compactor as shown in FIG. 8.

The mix design for the second (i.e. the top) layer consisted of 800 kg/m³ of a CEM II/A-T cement, 45 kg/m³ of CSA (calcium sulfo-aluminate) expansive concrete additive, 288 kg/m³ water, water-reducing additive with a dosage rate of 16 kg/m³, 715 kg/m³ of a 0-4 mm fine aggregate, 264 kg/m³ of a dolomite filler material, and 9.0 kg/m³ of a polypropylene fiber with length of 19 mm. This mix was placed on the first layer concrete after the first layer had achieved final setting.

The test slab was cast directly adjacent and in contact with an existing concrete slab without construction or isolation joints. After several months of service, including one winter and abrasion/scaping of steel buckets on the concrete surface from excavators picking up aggregate from stockpiles, the slab remains in good condition with no signs of wear and limited and well-controlled cracks, even adjacent to wide cracks in the neighboring slab of traditional concrete.

Example 3

This example comprises a design example of an external slab as the invention with 5000 m² area. The slab is designed as a continuous slab without any internal joints on a k=0.08 N/mm² reaction coefficient. The only joints are the day joints, due to limitation of the daily capacity of a particular group of workers (e.g. about 5000 m² area) and which are not connected with limitations or requirements of the technology. This design is suitable for ramps or aprons with 44 metric ton lorries, with up to 62 kN wheel loads, and 10 tons axle. Using the design approach and ratio of the components described in Example 1, a thickness of 100 mm (30 mm thick flexural-hardening fibre reinforced mortar second layer and 70 mm thick gap-graded first layer) provides sufficient capacity. In case a reaction coefficient of k=0.03 N/mm² is used in the design, the thickness increases up to 140 mm (40 mm thick flexural-hardening fibre reinforced mortar second layer and 100 mm thick gap-graded first layer). The required thickness of slabs from of the invention are significantly thinner than any traditional design.

Some further examples of implementation of the invention are summarized in the tables 1 and 2.

TABLE 1

Contents of the gap-graded concrete first layer (the bottom layer)

Gap-graded concrete first layer (the bottom layer)

| Example No. | Cement [kg/m³] | SCM* Slag [kg/m³] | SCM* Fly ash [kg/m³] | Filler [kg/m³] | Water [kg/m³] | Coarse aggregate Dosage [kg/m³] | Coarse aggregate Particle size [mm] | Fibers Dosage [kg/m³] | Fibers Type | Fibers Length [mm] | Fibers Diameter [micron] | Admixture Water reducing [kg/m³] | Admixture Hydration-controlling admixture [kg/m³] |
|---|---|---|---|---|---|---|---|---|---|---|---|---|---|
| Example 4 | 415 | | | | 110 | 1484 | 20-45 | | | | | 2.50 | |
| Example 5 | 200 | | 100 | | 114 | 1560 | 8-16 | 35 | Steel | 350 | 750 | 1.20 | |
| Example 6 | 300 | 100 | | 300 | 105 | 1190 | 4-8 | | | | | 2.20 | 1.2 |
| Example 7 | 290 | | | | 87 | 1500 | 5-22 | | | | | 1.74 | |
| Example 8 | 20 | 395 | | 100 | 102 | 1385 | 8-16 | | | | | 1.5 | |
| Example 9 | 310 | | | | 90 | 1564 | 8-16 | 7 | Synthetic | 35 | 500 | 1.79 | 1 |
| Example 10 | 310 | | | | 90 | 1545 | 8-32 | | | | | 1.79 | |

*SCM = supplemenatary cementitios material.
The thickness of the gap-graded concrete first layer (the bottom layer) in the examples is as follows: example 4-60 mm, example 5-120 mm, example 6-60 mm, example 7-160 mm, example 8-60 mm, example 9-60 mm, example 10-60 mm.

TABLE 2

Contents of the flexural-hardening fiber reinforced mortar second layer (the top layer)

Flexural-hardening fiber reinforced mortar second layer (the top layer)

| Example No. | Cement [kg/m³] | SCM* Slag [kg/m³] | SCM* Fly ash [kg/m³] | Microsilica [kg/m³] | Filler [kg/m³] | Expansive concrete additive Dosage [kg/m³] | Expansive concrete additive Type | Water [kg/m³] | Fine aggregate [kg/m³] | Fibers Dosage [kg/m³] |
|---|---|---|---|---|---|---|---|---|---|---|
| Example 4 | 500 | 400 | | | 100 | 40 | CSA** | 315 | 746 | 1.5 |
| Example 5 | 1200 | | | | | 30 | CSA** | 245 | 821 | 27 |
| Example 6 | 500 | | 400 | | 200 | 40 | tricalcium aluminate | 315 | 650 | 1.5 |
| Example 7 | 800 | | | | 264 | 45 | calcium oxide | 288 | 715 | 150 |
| Example 8 | 60 | 1140 | | 20 | 250 | 45 | CSA** | 265 | 680 | 9 |
| Example 9 | 750 | | | 50 | | 20 | CSA** | 235 | 1195 | 7 |
| Example 10 | 900 | | | | | 20 | CSA** | 245 | 1115 | 6 |

Flexural-hardening fiber reinforced mortar second layer (the top layer)

| Example No. | Fibers Type | Fibers Length [mm] | Fibers Diameter [micron] | Admixture Water reducing [kg/m³] | Admixture Air entraining [kg/m³] | Admixture Hydration-controlling admixture [kg/m³] | Admixture Internal curing admixture [kg/m³] | Admixture Viscosity-modifying admixture [kg/m³] |
|---|---|---|---|---|---|---|---|---|
| Example 4 | Synthetic | 3 | 10 | 20 | 2.1 | 1.8 | 4 | 2.5 |
| Example 5 | Synthetic | 35 | 500 | | 3 | | | |
| Example 6 | Synthetic | 19 | 500 | 20 | 2.1 | 3 | | |
| Example 7 | Steel | 35 | 750 | 16 | 1 | | | |
| Example 8 | Synthetic | 35 | 500 | 13 | | | | |
| Example 9 | Synthetic | 35 | 500 | 11 | 1 | | 2 | 3.1 |
| Example 10 | Synthetic | 35 | 500 | 13 | 1.6 | | | |

*SCM = supplemenatary cementitios material.
**CSA = calcium sulfo-aluminate expansive concrete additive. The thickness of the flexural-hardening fiber reinforced mortar second layer (the top layer) in the examples is as follows: example 4-30 mm, example 5-30 mm, example 6-30 mm, example 7-40 mm, example 8-30 mm, example 9-30 mm, example 10-30 mm.

REFERENCES CITED

1. ACI 325.9R-15 "Guide for Construction of Concrete Pavements", American Concrete Institute Committee 325, 2015, pp. 62.
2. ACI 325.12R-02 "Guide for Design of Jointed Concrete Pavements for Streets and Local Roads", American Concrete Institute Committee 325, 2002 (reapproved 2013), pp. 32.
3. ACI 330R-08 "Guide for the Design and Construction of Concrete Parking Lots", American Concrete Institute Committee 330, 2008, pp. 36.
4. ACI 522R-10 "Report on Pervious Concrete" American Concrete Institute Committee 522, 2010 (reapproved 2011), pp. 40.
5. ACI 327R-14 "Guide to Roller-Compacted Concrete Pavements" American Concrete Institute Committee 327, 2015, pp. 51.

6. National Concrete Pavement Technology Center, "Guide to Concrete Overlay Solutions," 2007, pp. 29.
7. The Concrete Society, "Technical Report 34—Concrete Industrial Ground Floors—A Guide to Design and Construction", 2016, pp. 104.
8. CN 2 730 921 Y (Sun Xuegao) May 10, 2005.
9. JP 2017 133255 A (Taiheiyo Cement Corp.; Univ Tokyo Metropolitan) Mar. 8, 2017.
10. DE 10 2005 054235 A1 (Fitr Ges Fuer Innovation Im Ti; Baumbach Metall GmbH) 24 May 2007.

The invention claimed is:

1. A jointless concrete composite pavement, comprising:
 (i) a gap-graded concrete first layer;
 (ii) a flexural-hardening fiber reinforced mortar second layer,
 wherein the gap-graded concrete comprises cement, water and coarse aggregate with particles size from 4 to 45 mm;
 the flexural-hardening fiber reinforced mortar comprises cement, expansive concrete additive, water, fine aggregate with a maximum particle size of not greater than 8 mm; fiber reinforcement comprising of synthetic and/or metal fibers having diameter of 10 to 500 microns and length of 3 to 35 mm; wherein the total thickness of the composite pavement is selected depending on the required maximum service point load, using the following formula H=(F/100)0.5×100 mm, where H is the total thickness of the composite pavement and F is maximum service point load; wherein the ratio of the thickness of flexural-hardening fiber reinforced mortar second layer to the total thickness of the composite pavement is within the range of 1:5 to 2:5.

2. The pavement according to claim 1, wherein the gap-graded concrete first layer and/or the flexural-hardening fiber reinforced mortar second layer further comprises admixtures selected from the group consisting of air-entraining admixture, hydration-controlling admixture, internal curing admixture, water-reducing admixture and viscosity-modifying admixture and polymers.

3. The pavement according to claim 1, wherein the gap-graded concrete first layer comprises the following amount of ingredients in 1 m3 of the gap-graded concrete: cement 200-415 kg; coarse aggregate 1190-1800 kg, wherein the amount of water is selected to have the following range of water to cement ratio: 0.27-0.38.

4. The pavement according to claim 1, wherein the flexural-hardening fiber reinforced mortar second layer comprises the following amount of ingredients in 1 m3 of the flexural-hardening fiber reinforced mortar: cement 500-1200 kg; expansive concrete additive: 1 to 30% by mass of cement; fine aggregate 650-1200 kg; synthetic fibers 1.5-27 kg and/or metal fibers 15-150 kg; wherein the amount of water is selected to have the following range of water to cement ratio: 0.20-0.40.

5. The pavement according to claim 1, wherein 5-90% of the cement used in the gap-graded concrete first layer and/or the flexural-hardening fiber reinforced mortar second layer is replaced by supplementary cementitious materials.

6. The pavement according to claim 5, wherein the supplementary cementitious material is selected from the group consisting of ground granulated blast furnace slag, fly ash, microsilica, calcined clay, pozzolana of a natural origin, burnt shale and limestone.

7. The pavement according to claim 1, wherein 5-50% of the cement used in the gap-graded concrete first layer and/or the flexural-hardening fiber reinforced mortar second layer is replaced by mineral fillers, which are produced out of sedimentary igneous and/or metamorphic rock types.

8. The pavement according to claim 1, wherein 1-50% of the cement used in the gap-graded concrete first layer and/or the flexural-hardening fiber reinforced mortar second layer is replaced by supplementary cementitious materials and 5-45% of the cement used in the gap-graded concrete first layer and/or the flexural-hardening fiber reinforced mortar second layer is replaced by mineral fillers, which are produced out of sedimentary, igneous or metamorphic rock types.

9. The pavement according to claim 1, wherein the expansive concrete additive is selected from the group consisting of calcium sulfo-aluminate, calcium aluminate, tricalcium aluminate, calcium oxide and magnesium oxide.

10. The pavement according to claim 1, wherein the flexural-hardening fiber reinforced mortar second layer further comprises deformed bar reinforcement.

11. The pavement according to claim 1, wherein the gap-graded concrete first layer further comprises synthetic polymer fibres.

12. The pavement according to claim 1, wherein the pavement further comprises one or more layers of existing pavement or flooring below the gap-graded concrete first layer.

13. The pavement according to claim 1, wherein the coarse aggregate particles size is from 8 to 16 mm.

* * * * *